(12) United States Patent
Carter et al.

(10) Patent No.: US 6,259,516 B1
(45) Date of Patent: Jul. 10, 2001

(54) DUAL SENSOR DISTANCE MEASURING APPARATUS AND METHOD

(75) Inventors: Harold B. Carter, Metairie, LA (US); Kevin Schehrer, Boulder; Rikk Crill, Longmont, both of CO (US)

(73) Assignee: Quantum Imaging, Inc., Metairie, LA (US)

( * ) Notice: Subject to any disclaimer, the term of this patent is extended or adjusted under 35 U.S.C. 154(b) by 0 days.

(21) Appl. No.: 09/366,704

(22) Filed: Aug. 2, 1999

Related U.S. Application Data (63) Continuation-in-part of application No. 09/073,246, filed on May 6, 1998, now Pat. No. 5,973,770.

(51) Int. Cl.[7] .................................................. G01B 11/24
(52) U.S. Cl. ......................... 356/37.6; 356/372; 250/577
(58) Field of Search .................................. 356/4, 5, 372, 356/445, 448, 375, 376; 250/577

(56) References Cited

U.S. PATENT DOCUMENTS

| | | |
|---|---|---|
| 1,991,192 | 2/1935 | Bucky . |
| 4,247,784 | 1/1981 | Henry . |
| 4,322,627 | 3/1982 | Pirlet . |
| 4,551,719 | 11/1985 | Carlin et al. . |
| 4,692,023 | 9/1987 | Ohtomo et al. . |
| 4,708,483 | 11/1987 | Lorenz . |
| 4,748,846 | 6/1988 | Haynes . |
| 4,774,403 | 9/1988 | Arts . |
| 4,853,694 | 8/1989 | Tomecek . |
| 4,890,266 | 12/1989 | Woodward . |
| 4,893,933 | 1/1990 | Neiheisel et al. . |
| 5,095,747 | 3/1992 | Smith . |
| 5,164,608 | 11/1992 | Vali et al. . |
| 5,194,747 | 3/1993 | Culpepper et al. . |
| 5,235,398 | 8/1993 | Miller et al. . |
| 5,334,850 | 8/1994 | Ashida . |
| 5,337,289 | 8/1994 | Fasching et al. . |
| 5,648,844 | 7/1997 | Clark . |

Primary Examiner—Frank G. Font
Assistant Examiner—Reginald A. Ratliff
(74) Attorney, Agent, or Firm—Banner & Witcoff, Ltd.

(57) ABSTRACT

Apparatus and method for determining the level of a material in a vessel. In one embodiment, and optical emitter emits light onto a rotating mirror. The light reflects off of the rotating mirror and propagates into a vessel. At a first time, the light reflects back and is detected by a first detector. At a second time, the light is reflected back and is detected by a second detector. The distance to the surface of the material in the vessel can be determined using the difference between the first and second times. The volume of the material may also be determined based on this distance. Additional embodiments include rotating the light source itself, maintaining an inert gas near a surface of a window located between the steering mirror and an interior area of the vessel, tilting the steering mirror and first and second detectors to obtain a reflection at maximum intensity, and accounting for the tilt in calculating the volume.

21 Claims, 10 Drawing Sheets

DUAL SENSOR DISTANCE MEASURING APPARATUS AND METHOD

This application is a continuation-in-part of U.S. application Ser. No. 09/073,246, now U.S. Pat. No. 5,973,770 entitled "Method of Measuring the Relative Proximity of and Interacting With a Plurality of Media/Molecular Structures," and filed on May 6, 1998.

BACKGROUND OF TIRE INVENTION

The method and apparatus of the present invention relate generally to the field of measuring and/or interacting with relationships between or among a plurality of media and/or spatial materials. For example, the present invention may be used to measure the quantity of fluid in a container.

The advent of the modern computer has greatly enhanced the fields of absolute and relative measurement and increased the speed at which spatial, geometric and temporal relationships may be calculated. Display technology now permits large scale visual reproduction of data and images representing multi-dimensional relative proximity. However, the current art still does not provide much of the useful, often critical, information that would be desirable.

For instance, oil companies have a great need for accurate information concerning the volume of oil in storage facilities. Many times, the oil companies are not aware of leaks in the storage facilities until after significant amounts of materials have been lost, and after serious environmental damage has already occurred. The leak rate may be so slow that the leak is not detectable through available monitoring techniques.

Additionally, most devices currently used for measuring the contents of containers do not provide a sufficiently high degree of accuracy. While devices with somewhat greater accuracy are available, these devices usually come at a prohibitively high cost.

The oil and gas industry is a prime example where inaccurate measuring devices are commonly used. Anyone experienced in the oil and gas industry knows that a used petroleum storage tank is never really safe. In fact, the incidence of welding accidents and maintenance personnel deaths when such tanks are inspected, cleaned or otherwise maintained are numerous. These accidents occur even when extra safety precautions are taken, such as applying so-called nitrogen "blankets" to the tanks.

U.S. Pat. No. 5,493,903 describes one type of measuring device that involves the application of a strain gauge sensor to the exterior wall of a tank. The greater the volume of a substance within the tank, the greater the force pushing on the tank walls. The greater the force pushing on the tank walls, the greater the deformation of the walls. This deformation is translated into a strain gauge reading. However, such strain-gauge sensors often provide inaccurate readings in exterior storage tanks, where temperature and pressure variations due to weather conditions and the like alter the readings over time of day and season.

U.S. Pat. No. 5,487,300 describes another type of measuring device that uses a pressure sensor connected to the opening of a tank for indicating the pressure of the liquid in the tank. A processor translates the pressure signal to a level signal. There may, however, be sludge or other measurement distorting material at the opening of the tank where the pressure sensor is located that can clog the opening and distort or interfere with the accuracy of the pressure reading.

Other known techniques for level detection include using a manual dip stick. However, the use of a dip stick requires that the stick be inserted perpendicularly to the bottom of the container. If the stick is inserted at an angle, the reading will be artificially high. Of course, use of a dip stick is not automatic in that it requires a person's presence to take the reading. Moreover, the person taking the reading, depending on the contents of the container, may have to wear a gas mask or other safety apparatus to prevent inhaling dangerous fumes, and such manual measurement presents an undesirable risk of bodily harm.

Still other efforts to measure container contents have focused on the use of "pulse radar level measurement" such as various products produced by the Ohmart Corporation of Cincinnati, Ohio. However, such devices are less accurate, generally more expensive and pose difficult installation problems. Further, they do not support desirable features such as off-site communication and control.

U.S. Pat. No. 4,774,403 describes a position measuring device using a triangulation scheme for position sensing. According to the invention, a laser light beam is reflected off the surface of container contents differently from when light is reflected off the bottom surface of the container. A lens of a sensor deflects the received light to different locations of a CCD linear array. Also, U.S. Pat. No. 5,337,289 discloses an acoustic surface mapping system useful in mapping the contours of solid container contents.

Current methods do not provide a sufficiently high degree of differentiation between different substances that may be within a tank, such as petroleum and water. Furthermore, current systems are ineffective for providing early warning of the theft of petroleum products from tanks, many of which are in remote locations. This is particularly problematic in underdeveloped countries where the additional hazard of intentional sabotage may greatly increase the incidence of severe environmental damage and product loss and where many industrialized nations now expend a large portion of their exploration and production budgets. Consequently, there exists a need for an improved means of acquiring container content information and promptly responding to such information.

SUMMARY OF THE INVENTION

The present invention addresses the problems described above by providing a novel method and apparatus for the collection and use of information regarding the relative proximity of a plurality of media/molecular structures. Various advantages of one or more embodiments of the present invention include increased accuracy and dependable results.

An object of the invention is to provide a means for measuring the distance between a surface, whose position may vary, and a well-known point.

In one embodiment, light is directed toward the surface of material in a natural or man-made container and a reflection of the light is detected at a first detector, and then at a second detector. The level of the material may then be determined based on the time between detection of the reflected light at the first and second detectors, and the known orientation of the first and second detectors.

In an aspect of an embodiment of the present invention, measurements may be made even if the container is tilted, or not truly vertical.

In a further aspect of an embodiment of the present invention, measurement of the contents of a tilted container may be made by tilting a structure containing first and second detectors to maximize the light reflected from a material within the container and detected by the first and second detectors.

In another aspect of an embodiment of the present invention, the amount of two or more substances within a container can be accurately determined.

A further embodiment can be used to measure the distance of various fluid levels from the specific physical location of the apparatus of the embodiment.

In a further embodiment, the embodiment may be attached to the hatch cover of an existing entrance to a tank, or to threaded pipe fittings that already exist at the top of the tank. Either installation method would eliminate the danger of welding sparks or other potentially dangerous emissions during installation because the hatch cover would be removed from the tank (replaced by another) during the installation of the invention on the original hatch cover.

In another aspect of an embodiment of the present invention, the additional knowledge of the shape of a container in which a fluid is contained may be used for determining the volume of fluid in the container or the change in the volume of fluid in the container. The current invention offers a less expensive, safe means of measuring and monitoring the container contents. Utilizing the emission detection device described in U.S. patent application Ser. No. 08/562,947, entitled "A Method for the Capture of Data and Images Utilizing a Minimum of Mechanical Activity", filed Nov. 27, 1995, (now abandoned) and International Patent Application of the same title, PCT/US96/19067 filed Nov. 27, 1996, and incorporated herein by reference, the internal volume of a container such as a tank, a pipe or other vessel is first measured using a processing program. Then an array of detectors using the same concepts is programmed to measure the liquid level of the content of the housing by measuring the temperature and/or other electromagnetic differential between the contents and the interior surfaces such as the walls of the vessel/container. (The terms "vessel" and "container" may be used interchangeably herein, and are meant to include tanks, field separator tanks, cracking towers, pipes, tubing, salt domes and all other natural or man-made means of containing a material). The volumetric content of the vessel/container may be derived by applying calculus while taking into consideration other variables such as the factors comprising Boyle's law. Periodic or constant monitoring of the contents of a container gives prompt notice of any unintended change, and may be used to measure and control content withdrawal and inventory.

In another embodiment, a container with known shape and dimensions is used. An emitter, for example, an acoustic emitter emits a limited amount of energy which results in an absorption and a degree of reflection from the surface of the liquid and the container. One or more sensors are located in known proximity to the surfaces of the container such that they receive different readings from the container than from any reflections or emissions from the surface of the contents within the container. In this manner, the readings may be translated into a volume reading of various contents such as fluids in the container that is accurate and reliable, notwithstanding the weather conditions prevalent outside the container.

In yet another aspect of an embodiment of the present invention, fiber optic cable or other materials that can be rendered nonconductive and/or physically separated from the interior of the container may be used for emitting and receiving the energy, further reducing the risk of an accident.

In another embodiment, a measuring device is installed to measure fluid content within a tube or pipe.

Another advantage of one or more embodiments of the present invention is the capacity to ascertain with relative accuracy the water content of petroleum storage containers. This is accomplished through interrogating the areas (generally the bottom) of the container with electromagnetic and/or acoustic energy. While these water deposits may be in fractal geometric configuration, they may be of sufficient quantity to warrant measurement for various purposes.

In one or more embodiments of the present invention, the container may be stationary, or, in a more complicated setting, floating and/or otherwise mobile or even accelerating. These and other features of the present invention will be apparent upon consideration of the following detailed description of preferred embodiments. Although the invention has been defined using the appended claims, these claims are exemplary in that one or more aspects of the invention includes the elements and steps described herein in any combination or subcombination. For example, it is intended that each of the above aspects or embodiments of the invention may be used individually and/or in combination with one or more other aspects or embodiments of the invention. Accordingly, there are any number of alternative combinations for defining the invention, which incorporate one or more elements from the specification, including the description, claims, aspects of the invention, and/or drawings, in various combinations or subcombinations. Accordingly, it will be apparent to those skilled in measurement systems, in light of the present specification, that alternate combinations and subcombinations of one or more aspects or embodiments of the present invention, either alone or in combination with one or more elements and/or steps defined herein, may constitute alternate aspects of the invention. It is intended that the written description of the invention contained herein cover all such modifications and alterations.

BRIEF DESCRIPTION OF THE DRAWINGS

For a more complete understanding of the invention, one should refer to the embodiment illustrated in greater detail in the accompanying drawing and described below by way of examples of the invention.

In the drawings.

It should be understood that the drawings are not necessarily to exact scale, and that certain aspects of the embodiment are illustrated by graphic symbols, schematic representations and fragmentary views. It should also be understood that when referring to physical relationships by terms such as "upper", "lower", "upward", "downward", "vertical", "horizontal", "left", "right" or the like, such terms have reference solely to the orientation depicted in the drawing. Actual embodiments or installations thereof may differ.

DETAILED DESCRIPTION OF THE PREFERRED EMBODIMENT

Figure 1:
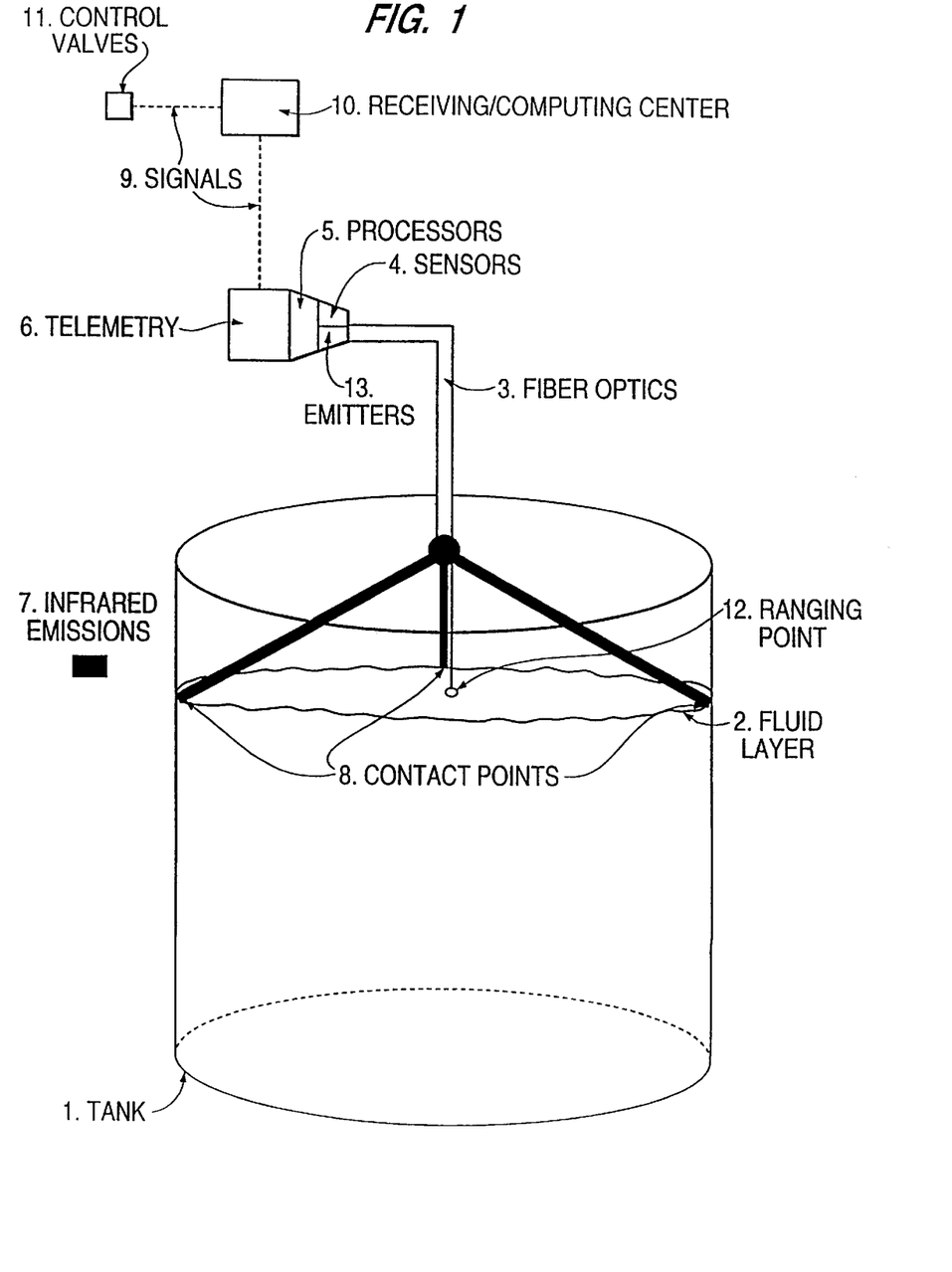
FIG. 1 depicts a perspective view useful in describing in very general terms a first embodiment of the present invention when used in monitoring the fluid content of a container such as an oil storage tank.

Referring to the figures, FIG. 1 illustrates a tank, the fluid level of which is being monitored using the method and apparatus of the invention. The tank has a known shape, known dimensions and known volume. Typically, the sensor is capable of receiving an image of an object which, via focusing means for focusing on that object, has determinable distance from the sensor, much to the same extent as a rangefinder is utilized in a camera. In this manner, the actual volumetric shape of the container can be compared with and calibrated against the actual or predetermined characteristics of the container at rest (not under compression, tension or adverse temperature or other extremes). Once the tank receives a volume of liquid, the tank 1, and the level of its contents, the fluid 2, are interrogated by emitters 13 to the sensors 4, via a fiber optic cable 3, which collects emissions 7, from contact points 8, where the surface of the fluid meets the wall of the tank.

Since many tanks are located underground, their precise dimensions and orientation are difficult to measure. Initially, these dimensions must be determined with reasonable accuracy. Then the interior of the tank can be measured with knowledge of its approximate fluid content, ascertained by conventional means. Next, sensors detecting electromagnetic emissions confirm the precise fluid level of the contents. Thereafter a "timegating" mechanism similar to a rangefinder can find a ranging point 12, and can supply the only unknown in the equation needed to measure the contents of the tank.

In a first embodiment of the present invention, a fiber optic cable 3 for conducting energy of emitters 13 to the container for illuminating the tank 1 as needed and for receiving and transmitting received readings to remote sensors 4 is not used. In such an embodiment, a sensor, a light source and focusing means (in the form of a rangefinder) are all mounted interior to the tank. This embodiment may be utilized for less hazardous liquids such as water. According to another embodiment, all measurements are captured and emissions 7 required enter and leave the container through a fiber optic cable 3 (or via a non-conductive separating, transmissive media), reducing the possibility of introducing potentially dangerous, electrical or electromagnetic activity into the container. The fiber optic cable or other media is a conduit or window for communicating information to the sensors 4, which, in turn, provide the captured signals in digital form to a processor or processors 5. The processors may be remotely located and so coupled to the sensors via a communications link (not shown). In the depicted embodiment, the processed data signals 9 are forwarded to a remote receiving/computing center 10. There the raw digital data may be further processed and, if necessary, formed into image data for display.

The computing center 10 may compare an expected depth reading with a determined depth reading or compare a depth reading with a similar reading over time and determine that a reading is out of limits, for example, suggesting an environmental spill, or the absence of a periodic reading may indicate a problem. The computing center 10 then may provide further output signals 9 for activating certain control valves or other output devices 11 that can cause tank closure, evacuation, pressure release and/or other responses such as the release of fire retarding/extinguishing materials appropriate to the management of various adverse conditions and/or to give warning to proximately located inhabitants, for example, of the potential release into the ambient environment of toxic or hazardous substances. Output signals may trigger automatic dialing equipment to alert proximate residents of imminent danger, or weather emergency broadcast systems may be signaled to display warnings as captioning of a television broadcast in a known manner.

Moreover, the output signals may have other influences on container content actions. The output signals may have direct influence on other than container related valves and the like. For example, the output signals may provide an input to automatic steering and/or navigational equipment to impact the aircraft or tanker ship's navigational corrections to further promote as level and non-turbulent a flight/passage as possible for the cargo and crew and/or give early warning to those personnel in control of air, land or sea transportation facilities of the impending dangers of actual or potential content spillage.

Figure 2A:
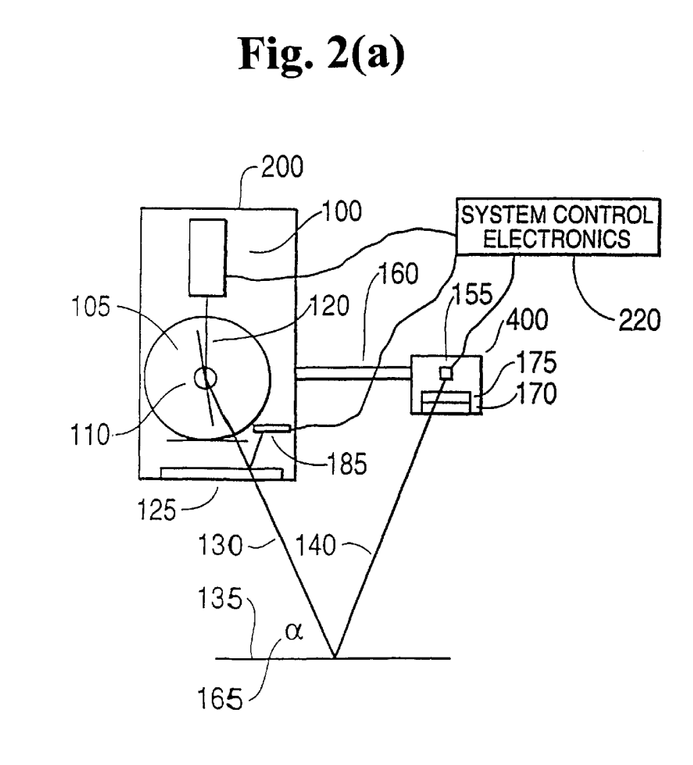
FIGS. 2(a)–(b) depict a schematic of a level measuring system in which a laser beam is steered and reflected from the liquid surface.
Figure 2B:
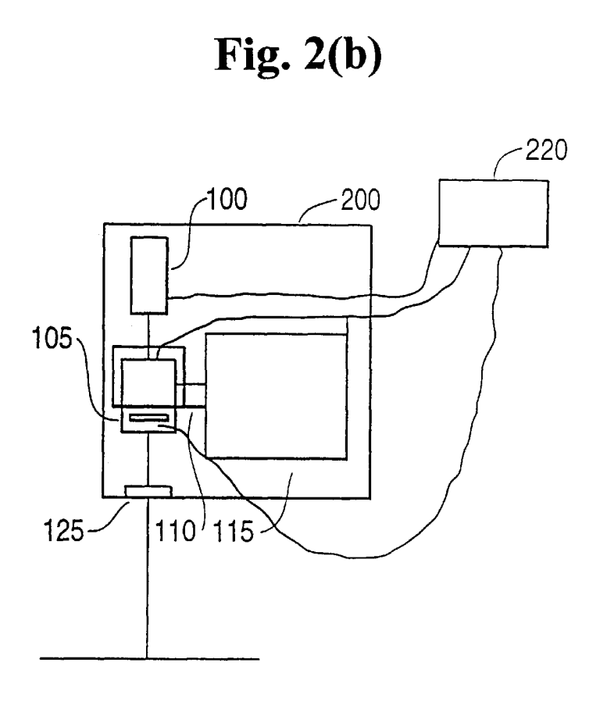

FIGS. 2(a)–(b) show schematic depictions of a more specific embodiment of the invention, particularly in tanks that are already in place. In this embodiment, a laser 100 is used as the light source owing to its ready and inexpensive availability and simplification in engineering other related components due to its relative inherent collimation. Alternatively, any collimated source can be used and the source can be polychromatic and need not be spatially or temporally coherent. The laser 100 is housed in the source housing 200, which protects the assemblies inside the housing from the environment.

The laser 100, when ON, is incident on a steering mirror or optic 105 which is preferably made of polycarbonate and coated with passivated aluminum. Alternatively this steering optic could be reflectively coated glass, or any other reflective material. The steering optic 105 can also be a prism or other molded or ground optical component that can redirect the direction of the laser light and may or may not have optical power in one or more axes. In particular, the steering optic 105 can be a polygon such that the range through which the beam is steered by any single facet of the polygon is approximately equal to, but greater than, the range of angles corresponding to the range of physically realizable distances to a spectrally reflecting interface.

The steering optic 101 is attached to a shaft 110 that is rotated by an electrically driven motor 115. Alternatively, the motor 115 can be replaced by a piezoelectrically driven rotation stage with a steering optic attached thereto, or it can be replaced by a mechanically driven rotation stage via a worm drive and a stepping or continuous motor. In a preferred embodiment the motor can be driven bidirectionally or continuously.

Figure 3:
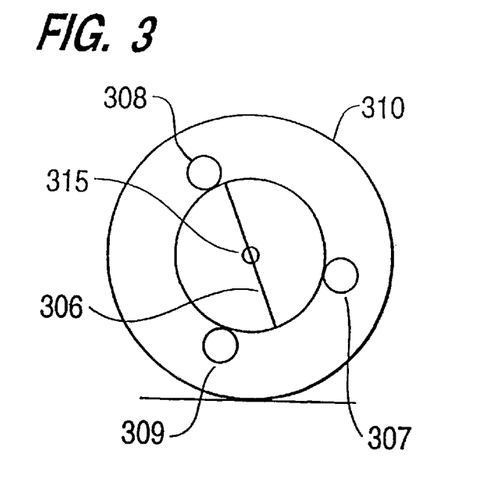
FIG. 3 depicts a schematic of an alternate means for implementing a steering optics where the steering optic is circular in cross-section and constrained by rollers.

An alternative means for steering the laser beam is illustrated in FIG. 3 whose operation may be described with reference to FIG. 2. A steering optic 305 is directly attached to the shaft of a motor 310, and the shaft of the motor 315 is used to drive a steering optic 305 that itself is constrained by rollers 307, 308 and 309. The steering optic 305 has a reflective surface 306 embedded in it while its outside surface is circular.

After reflection by the steering optic 105, the light beam 120 is incident upon a flat window 125. Some of the light that is incident on said window 125 is reflected, either due to the refractive index change between the gas; for example, air, in the housing 200 and the window material, or because a partially reflective coating was placed on the interior (to the housing) or exterior surface of the window. In one embodiment, the window is flat, with the interior surface uncoated and the exterior surface antireflection coated. Thus, the partially reflected light results from the air-window refractive index inequality (approximately 4% reflection). Alternatively, the window 125 could have optical power in one or more axes. The window 125 is preferably made of molded acrylic but could also be made of float or ground glass or other optically transparent material. The window 125 serves also to isolate the container and the vapor that resides above the fluid from sparks that might occur inside the housing 200.

In an alternate embodiment, the window 125 may actually be comprised of two or more layers of glass so that in the event of a failure in the first layer (such as a crack), one or more additional layers are available to maintain the integrity of the container.

The light 130 that is transmitted by the window 125 is incident on the surface of the liquid 135 below. The specular reflection 140 from the quiescent surface 135 of the liquid returns to the detector subassembly 400. In one embodiment the detector 155 is narrow in a direction parallel to the plane of incidence of the laser beam, and long in a direction perpendicular to said plane of incidence. The length of the detector 155 is chosen so that uncertainty in the orthogonality of the surface 135 to the plane of incidence can be accommodated. A window 170 is used to protect the parts in the detector subassembly 400 and to isolate the gases in the container from any spark that might occur at the electrical components inside the detector subassembly housing. As described above, this window 170 may alternatively be comprised of two or more layers. In addition, a spectrally narrow filter 175 with its pass band centered on the laser 100 wavelength is placed between the detector 155 and the window 170. Said filter 175 improves the signal to noise ratio by reducing ambient light that is generally not in the pass band.

Figure 4:
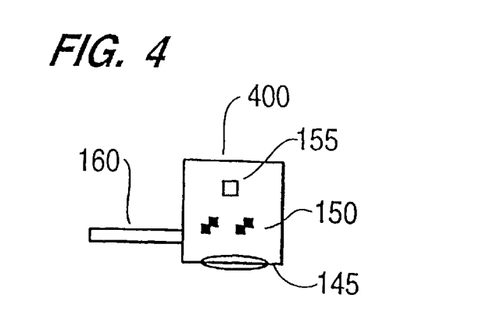
FIG. 4 depicts a schematic of an alternate detector subassembly using a cylindrical lens and a diffuser.

An alternative detector subassembly 400 is shown in FIG. 4. Capturing optics 145 and 150 are between the fluid 135 and a single detector 155. The capturing optics 145 have optical power in a single dimension such that the light is redirected in a direction orthogonal to the axis 160 that connects the single detector 155 and the source housing 200. In a preferred embodiment a cylindrical lens 145 is placed between the liquid surface 135 and the detector 155, so that it brings the light in proximity of the detector, which has in front of it a diffuser 150. The diffuser 150 ensures that even though light redirected by the cylindrical lens is not exactly in the detector 155, some of the light will be scattered into the detector 155 nonetheless.

Figure 5:
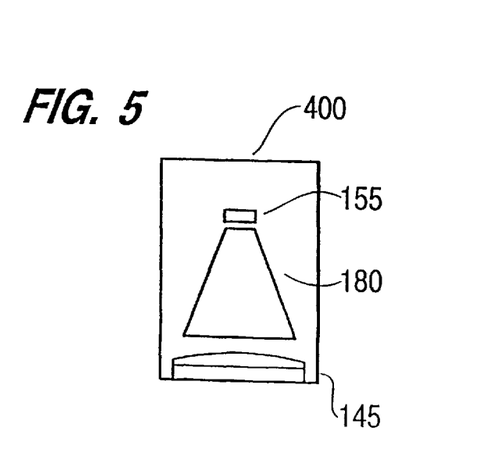
FIG. 5 depicts a schematic of an alternate detector subassembly using a cylindrical lens and a light pipe.

Still another alternative detector subassembly 400 is shown in FIG. 5. Capturing optics 145 and 180 are between the fluid 135 and a single detector 155. The capturing optics 145 have optical power in a single dimension such that the light is redirected in a direction orthogonal to the axis 160 that connects the single detector 155 and the source housing 200. In one embodiment a cylindrical lens 145 is placed between the liquid surface 135 and the detector 155, thus bringing the light in to proximity of the detector, which has in front of it a tapered light pipe 180. The possible angles of incidence onto the light pipe and the shape of the light pipe are designed so that once light has passed into the tapered lightpipe it is internally reflected until it reaches the output face near the detector. Alternatively, a tapered optical element 180 has sides except that its entrance and exit faces are coated with a reflective coating such as aluminum. Light then entering the tapered optical element is singly or multiply reflected until it reaches the detector.

Figure 6:
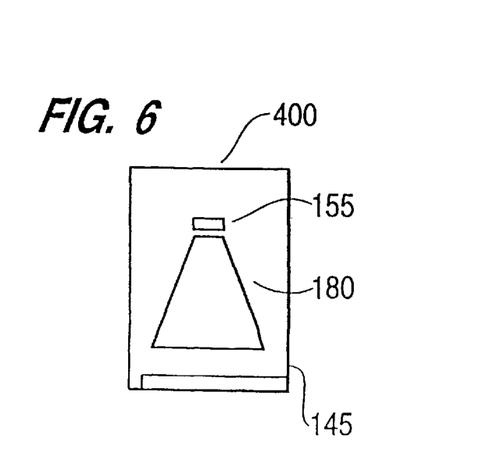
FIG. 6 depicts a schematic of an alternate detector subassembly using a tapered reflective truncated pyramid.

In another embodiment of the detector subassembly 400 the powered optic 145 is omitted in the subassembly shown in FIG. 6, and the light pipe 180 is sufficient to collect all of the light of interest on to the detector. As the angle α 165 of the source light 130 incident on the liquid interface 135 is changed, the signal from the optical detector 155 reaches and passes through its maximum value. When at its maximum value, the geometry of the light path is known within the uncertainty introduced by the plane of incidence and reflection not necessarily being parallel to the force of gravity; that is orthogonal to the plane of the liquid surface. Let s be the separation between the detector 155 and the point at which the source laser beam is incident on the steering optic 105. The distance s is fixed by the member 160 that connects these two parts of the invention. For simplicity of explanation, set the heights to be the same. If the heights were not the same, then the geometry would be more complex. However, it would be known from the design and the distance of the fluid from the axis 160 connecting the source and detector. The distance is given by:

$$d = s/2 \cot(\alpha)$$

The light that is partially reflected from the interior surface of the window 125 is incident on a linear detector array 185 set at an optical distance from the interior surface of the window such that the position on the linear array 185 corresponds to an angle α 165 at which the source laser beam is incident on the fluid surface 135. This correspondence between angle α 165 and the position along the detector array 185 at which the signal is a maximum can be computed from the particular design geometry or it can be determined by measuring the angle at which light leaves the window.

The system control electronics 220 control the laser 100, the linear array 185 that calibrates angle of incidence 165, the single detector 155, and the steering motor 115. The particulars of these electronics can be designed in many ways that are known in the art. For purposes of explanation, a particular use scenario is discussed herein. The power for the system may be remote and may be limited, such as batteries or a solar panel, which are best conserved by sampling only as often as necessary. For example, some of the factors that would influence the frequency of interrogating the fluid level of an oil field storage tank for both inventory and environmental protection purposes are flow rate, severity of ambient weather conditions, local political stability and the known physical condition of the facility. Thus, the system electronics may be put on a schedule and use minimal power in a shutdown mode between sample times.

When a sample time begins, the laser 100 is turned ON and allowed to stabilize its directionality, the steering optics 105 are then rotated while the linear array output 125 is input into sample and hold circuitry. The sample and hold circuitry may comprise a multiplicity of sample and hold circuits with buffers to maintain a history of the array 185 output. The output of the input signal is monitored by a peak detection circuit, which may also comprise a multiplicity of peak detection circuits with buffers. In the case of both the linear array 185 and the single detector 155 the multiplicity of sampling circuits and buffers can be used to reduce the effects of noise. That is, a peak in overall trend at the peak detection circuit can be discriminated against spurious noise and correlated with a particular position on the linear array. The particular position on the linear array 185 then corresponds to an angle of incidence 165 and therefore a depth of the fluid level. The depth and time may then be recorded locally or, alternatively, transmitted to a central processing unit that may monitor many similar tanks, or both.

Figure 7:
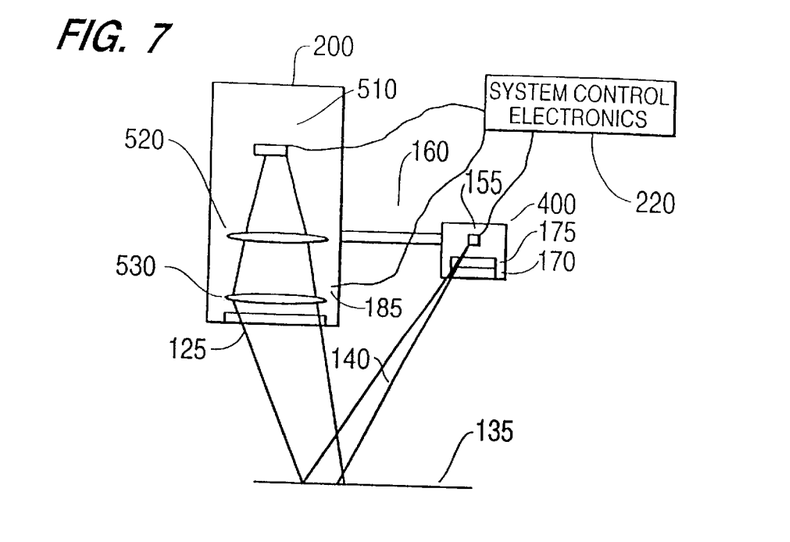
FIG. 7 depicts a schematic of a source that uses variable focus onto a detector.

In another embodiment shown in FIG. 7, a light source 510 such as a light emitting diode is used as the illuminating source and is incident upon focusing optics 520, 530. Alternatively, the light source 510 can be a diode laser that is either expanded and recollimated or is made divergent with another optical element such as a lens, sphere, or a non-Lambertion scatterer such as the materials offered by Physical Optics Corporation in Torrance, Calif. In one embodiment, the focus is variable by adjusting the distance (δ) between the two optical elements 520, 530. The relative lens position is adjusted by translating the second lens 530 with respect to the first 520 along the system optical axis using a fine pitch screw drive. Alternatively the first lens 520 can be translated with respect to the second 530 or they may both be moved so that the relative separation changes as well as the distance of the first lens 520 with respect to the source 510. The known applied voltage corresponds to the translation δ. Knowledge of the translation is sufficient to calculate the distance at which the source is focused.

The thin lens formula for a single lens is $$\frac{1}{s_1} + \frac{1}{s_2} = \frac{1}{f}$$

where $s_1$ is the distance from the object to the lens, $f$ is the lens focal length and $s_2$ is the image distance. Let $s_1$ be the distance from the source to the first lens 520 and δ the separation between the first 520 and second lens 530, r the distance from the second lens 530 to the detector 550 after specular reflection from the surface 540, and $f_1$ and $f_2$ the focal lengths of the first 520 and second lenses 530 respectively. Then r is given by $$r = \frac{f_2[\delta(s - f_1) - f_1 s]}{(s - f_1)(\delta - f_2) - f_1 s}$$

The detector 550 is either made very small or has an aperture placed in front of it so that the aperture or the detector is the same size or smaller than the minimum spot size given the accessible range in the value of r. The lens separation δ is varied until the signal on the detector reaches a maximum, at this point the distance r is the image distance of the source 510 form the second lens 530. From r and the separation of the source 510 and detector 550 one can compute the distance of the liquid level 135 from the detector 550, whence from the known geometry of the tank the volume of fluid in the tank can be computed.

Alternatively, the lens separation is monitored using a second source or, equivalently, light derived from the primary source. A flat reflective surface is part of each lens comprising the focusing optics lens pair.

A preferred embodiment scans a laser beam as shown in FIG. 9. A steering mirror 700 is attached to a shaft 705 that is turned by a motor 710. The laser 715 can be in almost any orientation but is shown horizontal in the figure. The laser beam is incident on the steering mirror 700 which redirects some or all of the light. During a fraction of the rotation period of the steering mirror 700, the laser beam is redirected in a generally downward direction and through a window 720. The laser beam then propagates down to the surface of the material, which may be a liquid, from which it is reflected. There is one time at which the light is at the angle that results in reflection to a first detector 725, and there is a later time at which the light is at the angle that results in reflection to a second detector 730. The distance to the material can then be determined using this time difference and the relative geometry of the steering mirror, incident laser beam and detector locations.

This embodiment provides a high degree of accuracy because the time difference can be very accurately measured. The relatively small distance between the detectors allows the device of the FIG. 9 embodiment to make measurements through a small aperture. For example, the embodiment shown in FIG. 9 may be connected using a three inch pipe fitting 735. This in turn allows the device to be constructed for easy installation using various types and sizes of apertures. As one example, the FIG. 9 embodiment might be installed onto a top hatch cover of a container using the threaded pipe fitting 735. As another example, the FIG. 9 device might be installed above a natural container, such as a salt dome, to measure the level of a material in the salt dome.

The top of the tank, and any fittings on it, might be at some arbitrary orientation with respect to vertical. Thus, the device would need to be approximately leveled to help ensure that the beam reflected from the fluid surface will be incident on at least one of the two detectors 725, 730.

The FIG. 9 embodiment includes a self calibration feature. The detectors 725, 730, steering mirror 700 and laser 715 are on a structure 740 that can be tilted with respect to the pipe fitting 735. The device may be programmed so that this structure 740 is automatically tilted until a reflection obtained at the detectors 725, 730 is at a maximum intensity.

This tilting may be accomplished by having the structure 740 pivot on an axis 745 as shown in FIG. 9. One side of the structure may be placed under tension using a spring 750. A cam 755 is installed on a motor shaft 760, which can be rotated to raise and lower the edge of the structure 740 thereby pivoting the structure 740 that includes the laser 715, steering mirror 700 and detectors 725, 730.

Some or all of the control and determinations discussed above may be performed by a processing system 765. The time difference may be determined using a processing system 765 communicatively connected to the first and second detectors. The processing system 765 is shown in FIG. 9 to be attached to the outside of the structure 740, but the processing system 765 may alternatively be located within the structure 740, or remotely from the structure. The processing system 765 may also determine the volume of material within the vessel based on the measured distance and the known geometry of the tank. The processing system 765 may also compare the distance, volume, or both, with an expected value, and provide an output signal in the event that the actual distance or volume is too far above or below the expected value. This output can be in the form of an alert, or it may be used to control other devices connected to the vessel in order to correct the situation.

The processing system 765 may include a microprocessor and memory so that the depth measurement can be converted to a volume measurement. This will typically be effected by multiplying the depth of the material within the tank by the cross sectional area of the tank in a plane perpendicular to gravity. The depth of the material within the tank may be determined using the measured distance to the surface of the material in the tank and the known depth of the tank itself Alternatively, this processing may be performed at a location remote from the tank. In such an embodiment, the device at the tank may transmit its measured data, such as the measured time, to the remote location for processing.

Figure 13A:
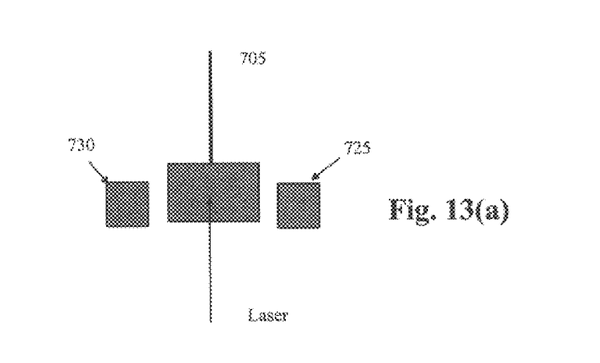
FIGS. 13(a)–13(c) depict an alternate embodiment of the present invention.
Figure 13B:
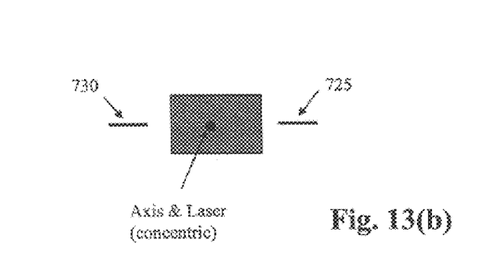
Figure 13C:
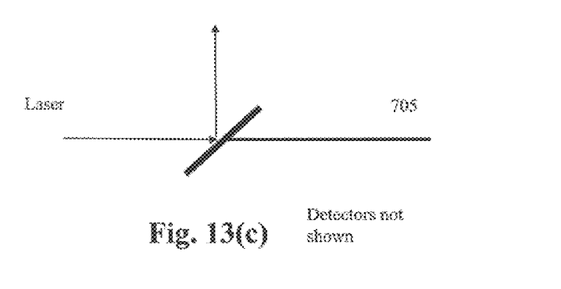

The processing may also include a means to calibrate the directly measured quantity, such as time, to a distance. For example, in the case of the FIG. 9 embodiment that scans a laser beam and measures the times at which the beam passes by two separated detectors, the time difference must be converted to distance. This may be done in at least two ways. The first way is to use the known geometry of the device to derive a trigonometric equation that relates the known quantities to the unknown quantity. In the case that the detectors are equidistant from the point at which the laser beam is incident on the steering mirror and this point and the two detectors are in a horizontal plane, the distance is given by:

$$d = \sqrt{\frac{1 - \cos^2(\omega t/2)}{s^2 \cos^2(\omega t/2)}}$$

or $$d = \frac{1}{s} \tan(\omega t/2)$$

Where d is the distance from the horizontal plane containing the detectors, ω is the frequency at which the steering mirror is rotating, 2s is the distance between the two detectors, and t is the time difference between arrival of the beam at the two detectors. FIGS. 13(a)–(c) show an alternative orientation of the mirror 700, axis 705, detectors 725 and 730, and a laser beam for which this method may be used to determine the distance to the liquid level.

Another method for converting the time difference to a distance, and one which is preferred, is through the use of look-up tables. In this case, a table of values is created so that for each of very many discrete values of time difference there is a unique distance. This table may be created through an initial calibration of the measurement system by moving a fluid level a known amount and recording the time difference for each of the known depths. This look-up table can then be stored in memory, and when a time difference is subsequently measured, the corresponding distance can be "looked up" in memory. The look-up table may also be used to correlate time differences with volumes. One reason why this approach is preferred lies in the fact that it requires less processing to convert a measured time to a distance.

With good quality control on the manufacture of the devices, they should be sufficiently similar in their geometry that only one look-up table needs to be measured. That is, the devices do not need to be individually calibrated, and no field calibration is necessary.

The FIG. 9 embodiment is merely one embodiment of the present invention, and based on the teachings disclosed herein, other alternative embodiments may also be achieved.

Figure 14:
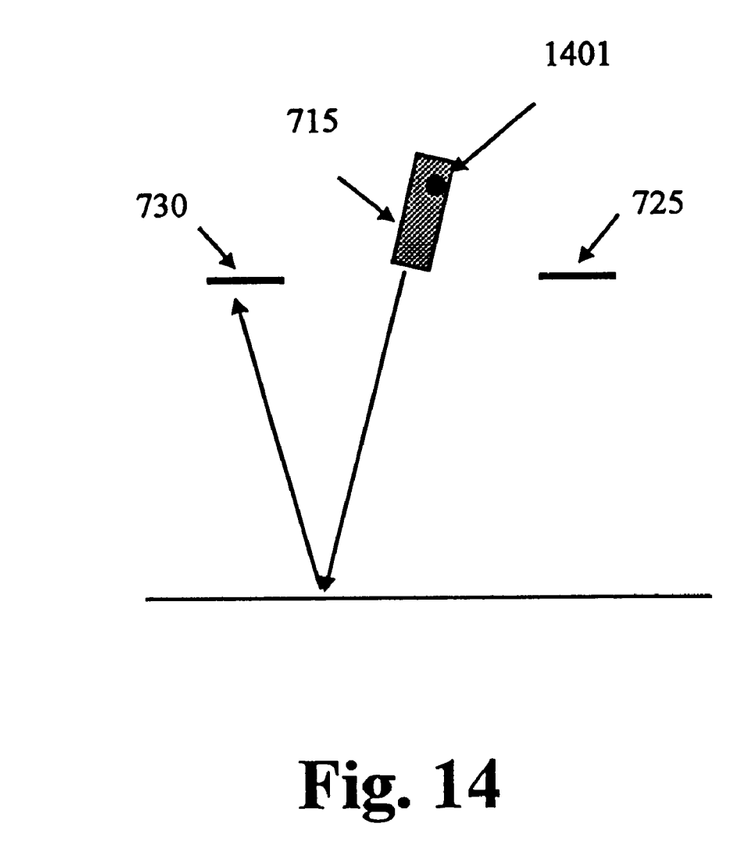
FIG. 14 depicts an alternate arrangement of the FIG. 9 embodiment.

For example, FIG. 14 depicts a modification of the FIG. 9 embodiment which may eliminate the need for the steering mirror 700. In the FIG. 14 embodiment, the light source 715 itself is rotated about an axis 1401. Preferably, the light from the light source 715 will form a line that includes the axis 1401. This alternate embodiment may be utilized in the same manner as the FIG. 9 embodiment discussed above.

The device may also include temperature measurement hardware and processing to adjust the measured volume to an equivalent volume at a standard temperature. In the oil industry, volumes are typically adjusted to their magnitude at 60 degrees Fahrenheit. Using known values for expansion rates of the material within the container, and a measured temperature (using, for example, a standard thermometer), the measured volume may be adjusted to the volume at 60 degrees Fahrenheit.

In some cases it may desirable to have a history of the fluid level stored locally at the tank or in the processing system 765. In this case, flash memory (or any other type of memory) may be included in the processing system 765 electronics to store measurements that are made on a periodic basis. Moreover, the electronics may be designed so that the history can be downloaded from the device via a standard interface such as RS232 to a laptop computer in the field.

In addition to the measuring of the fluid level at the top surface, a means for measuring the depth of the interface between oil, which rises to the top, and water, which resides at the bottom of the tank, is needed. In an alternate embodiment of the present invention, the water depth is measured by using an acoustic method. An acoustic source is mounted near the top of the tank and its mechanical housing is preferably integral to the housing of the optics assembly for detection of the top surface depth.

An acoustic source is made to "ping," i.e., a temporally short acoustic pulse is created. At any interface at which the acoustic velocity differs from one medium to the next, some part of an incident acoustic wave, or wave packet, will be reflected. The acoustic source is preferably spatially phased so that it is more collimated than an arbitrary acoustic source. The collimation is sufficient to minimize "noise" from reflections from surfaces that are not of interest such as the walls of the tank.

An acoustic detector is placed in proximity to the acoustic source. The detector records the time of the original pulse, the time from the original pulse to the first reflection from the top surface, the time from the original pulse to the reflection from the water/oil interface, and the time from the original pulse to the bottom of the tank. These time of flight measurements, the known acoustic velocity in each of the media, and the geometry for the tank are sufficient to determine the volume of water in the tank. It should be noted that the accuracy of this measurement is typically less than optical methods and it is therefore preferred that the overall tank liquid depth in the tank be measured optically.

Figure 8:
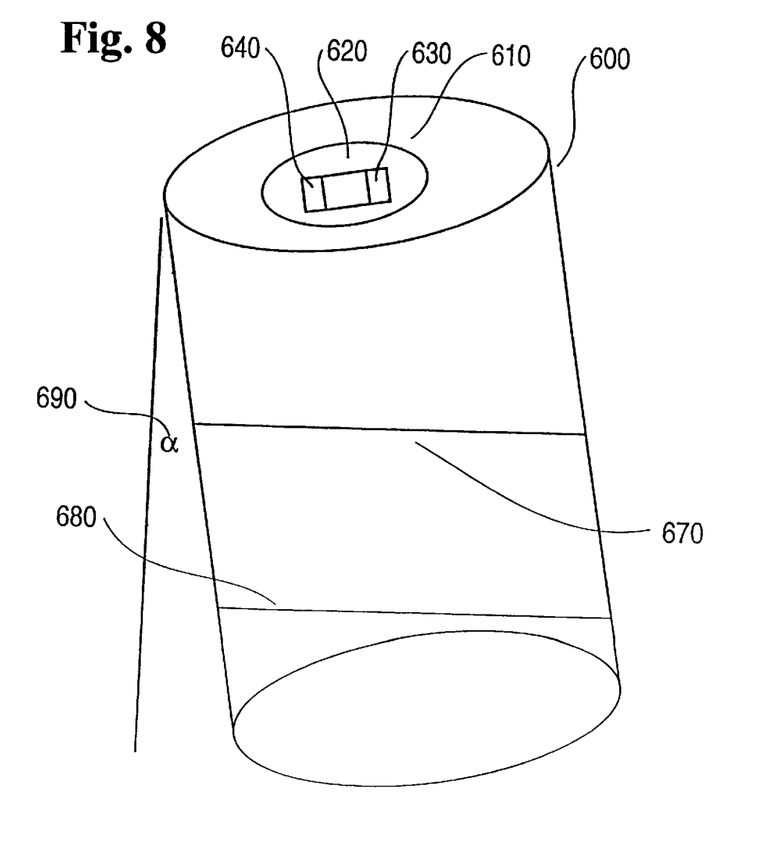
FIG. 8 illustrates the various subsystems on a tilted cylindrical tank with two fluids immiscible in each other.
Figure 9A:
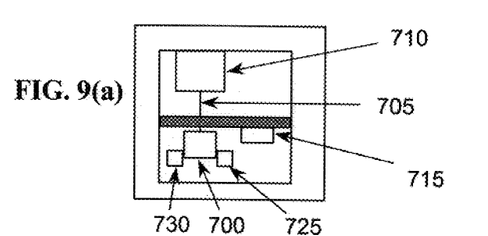
FIGS. 9(a)–9(d) depict top, front, bottom, and side views, respectively, of a preferred embodiment of the present invention.
Figure 9B:
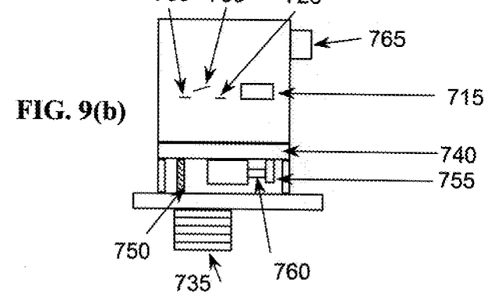
Figure 9C:
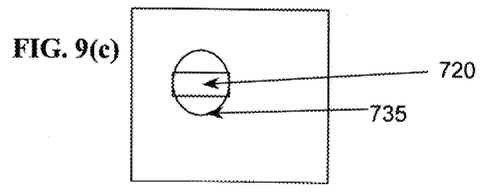
Figure 9D:
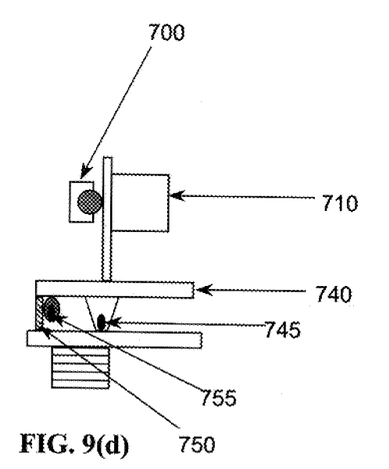

Referring to FIG. 8, there is shown the various subsystems on a tilted cylindrical tank 600 with two fluids, such as oil and water, immiscible in each other. The water is shown below line 680 while the oil is shown between line 680 and line 690. The angle α represents the degrees of tilt from vertical of the cylindrical tank shown. The apparatus of an alternate embodiment of the present invention is shown mounted on the hatch or cover 620 of the tank, where the ceiling of the tank is represented by numeral 610. Portion 640 is the laser depth finding apparatus and portion 630 may be the acoustic pinging and detector apparatus.

While the surface of the fluid will necessarily be perpendicular to the gravitational acceleration vector, the fluid surface may not be truly perpendicular to the walls of a normally upright cylindrical vessel or parallel to a floor or a ceiling 610 thereof. Consequently, the fluid surface boundary will, in general, trace out an ellipse (instead of a circle). For installed and uncharacterized vehicles, this poses the problem that a change in fluid level cannot immediately be translated into a change in volume. However, for the special case of vessels with parallel walls or known geometries, and cylindrical vessels in particular, knowledge of the number of degrees out of plumb or a of the tank walls is sufficient to allow computation of volume changes from measured fluid level changes. Moreover, this variance from plumb can, in a preferred embodiment, be determined by attaching a level to the side of the vessel whose readout is sent to central processor 10 (FIG. 1). The volume change can thereby be computed from the level change. In yet another embodiment, if the top of the tank is perpendicular to the vessel walls or if the orientation of the housing with respect to vessel walls is known, then the level can be placed inside the housing.

In many of the embodiments there is a window or lens that isolates the components of the fluid measurement device from the tank. Specifically, all electronics components are on one side of the window or lens so that there can be no spark or potential difference where there are flammable vapors in the tank. This window may be coated so that vapors, fluid, molds or fungi can not grow on its surface. In a preferred embodiment the window may be coated with sapphire and highly polished so that no material or living matter can adhere to it. Furthermore, and as discussed above, the window may be comprised of two or more window layers, such that the containment integrity of the container may be maintained in the event of a crack or failure in one window layer.

Figure 10:
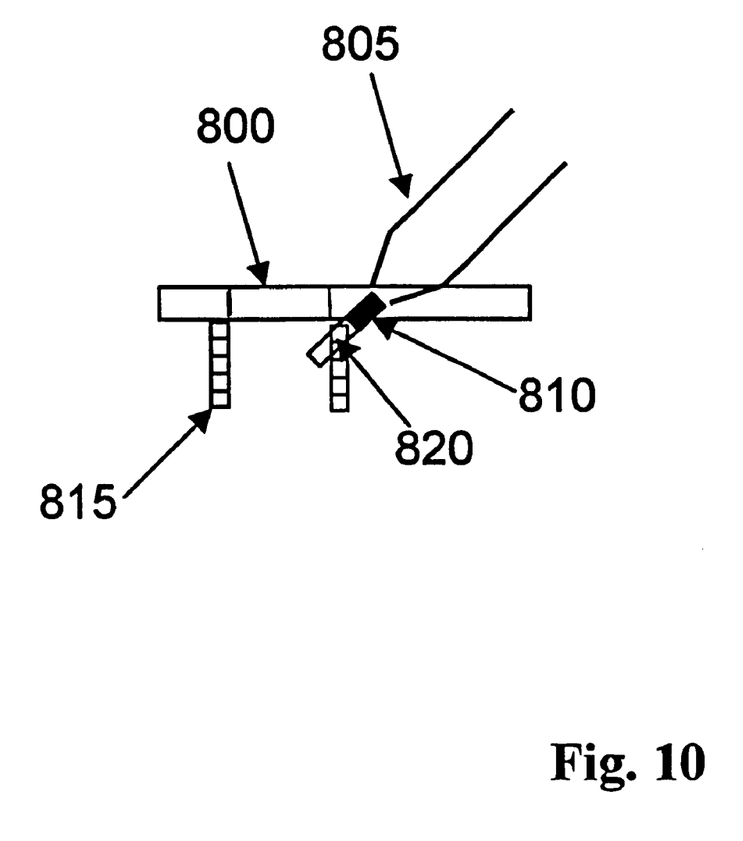
FIG. 10 depicts a window assembly according to an alternate embodiment of the present invention.

A cross-section of an alternative embodiment is shown in FIG. 10. The window 800 may be protected by an inert gas such as helium. In the case shown, a pocket is formed by a pipe fitting 815. The helium canister 805 is installed in a stainless steel fitting 820 and the helium diffuses slowly through a membrane 810 to replace the helium that escapes the pocket created by the pipe fitting 815 and window 800 or lens.

A wired or wireless interface may be added to any of the embodiments described above. This interface may transmit measured and/or calculated data, such as the depth or the volume of material in the tank, to a central receiver or transceiver. The interface could be made wireless by using a pager, mobile phone, radio transceiver, or the like. While the interface may also be wired, the wireless interface would be advantageous in locations where wired telemetry or equipment is impractical.

The wired or wireless data interface would allow for real-time inventory control and notification of unintended fluid level changes as in the case of a hazardous or environmentally hazardous leak or spill. Moreover, one or more embodiments of the present invention may include hardware such as copper wire, coaxial cable, fiber optics, pagers, mobile phones, radio or microwave links, or any other communication hardware to directly notify the proper authorities should an unintended change in fluid level occur.

In another embodiment, the fluid level in a tank that is being drained (or filled) may be anticipated. To accomplish this, known data from an existing flow meter (such as the flow rate) may be used in conjunction with knowledge of the instantaneous fluid level.

Figure 11:
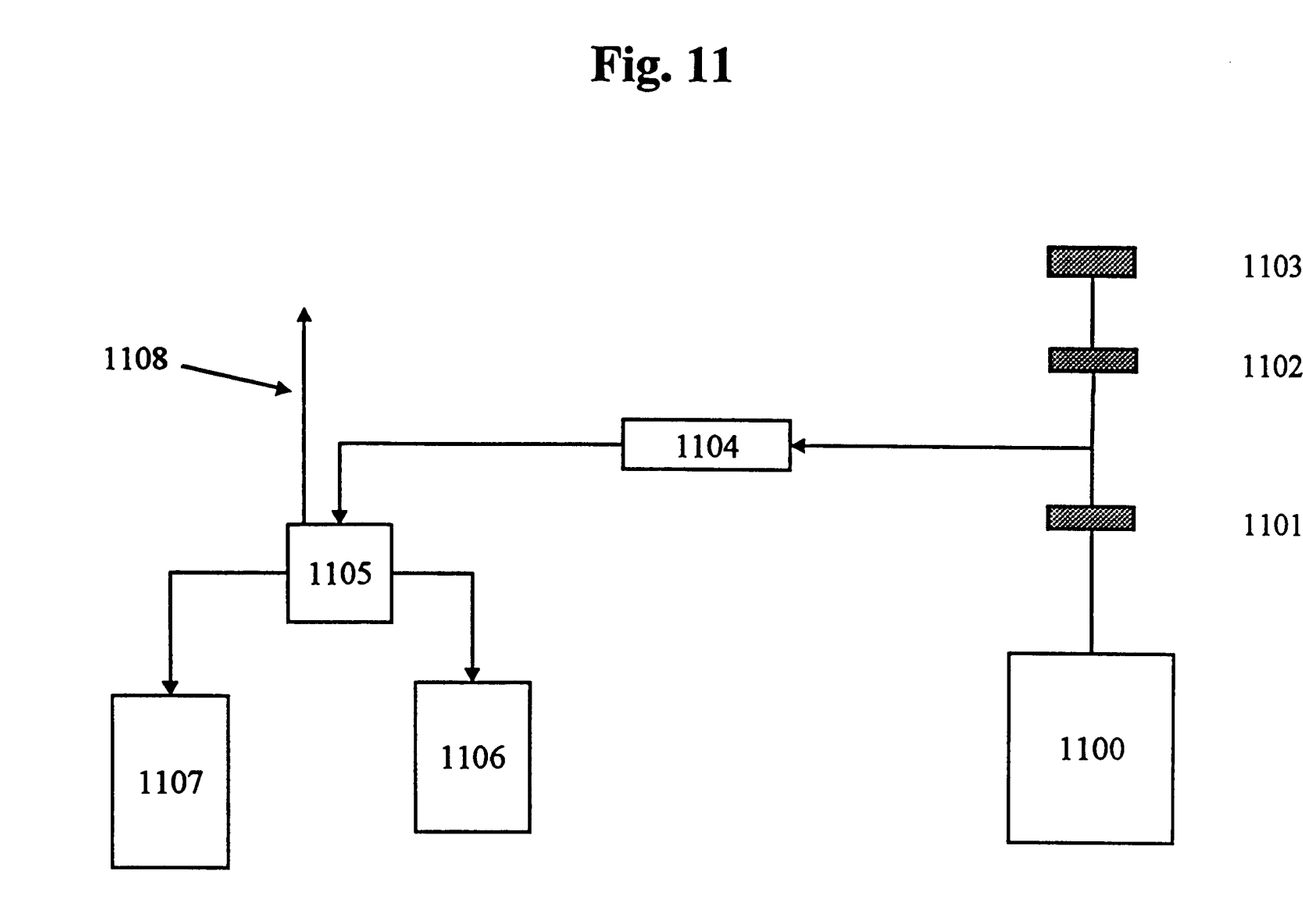
FIG. 11 depicts basic components of an exemplary oil system, and locations in which one or more embodiments of the present invention may be installed.
Figure 12A:
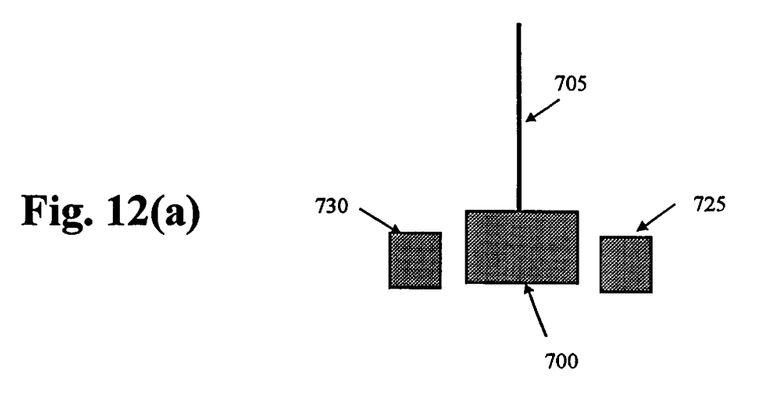
FIGS. 12(a)–12(b) depict the FIG. 9 embodiment in closer detail.
Figure 12B:
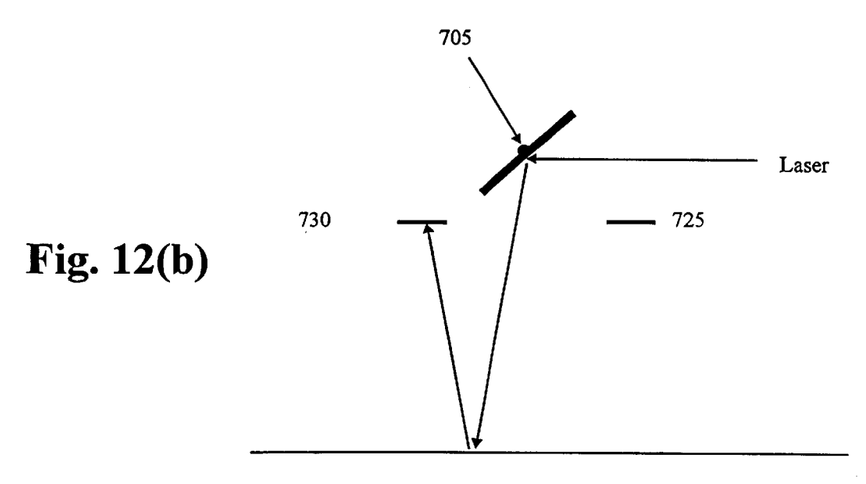

In yet another embodiment, the present invention may be installed at the well head in an oil well system for increased accuracy. For example, FIG. 11 depicts exemplary components within an oil well system. In the system, an oil well 1100 obtains fluid (which contains oil and various impurities such as water and other gases) and pumps the fluid through tubing to a choke box 1104. The choke box 1104 limits the flow of fluid through the tubing, and also acts as a filter. From the choke box 1104, the fluid flows to a field separator 1105, which separates the water, oil, and gas components of the fluid. The oil is then stored in an oil tank 1106, while water and gas are routed to locations 1107 and 1108, respectively for further processing. Valves may also be located at various points in the system. In FIG. 11, a master valve 1101, safety valve 1102, and safety cap 1103 are shown.

In this embodiment, one or more of the measuring devices disclosed above may be installed inside the tubing at various points in the system shown in FIG. 11. For example, a measuring device might be installed at the master valve 1101 to measure fluid in the tubing between the well 1100 and the master valve 1101. Other locations for measuring devices may be in the tubing between the choke box 1104 and the field separator 1105, or within the field separator itself. It will be understood, given the foregoing discussion, that one or more of the measuring devices disclosed herein may be utilized within tubing or pipes to measure the level of a substance within the tubing or pipes with a great degree of accuracy.

The discussion above provides exemplary aspects and embodiments of the present invention, but the invention is not limited to the particular configurations disclosed. Rather, the disclosed embodiments are merely exemplary embodiments. Those skilled in the relevant arts will readily appreciate the fact that many variations to the disclosed embodiments may be made without departing from the spirit and scope of the present invention. For example, one or more of the disclosed aspects or embodiments may be combined with one or more other aspects or embodiments. All patent applications and patents referenced herein should be deemed to be incorporated by reference as to their entire contents.

What we claim is:

1. A system for making a measurement in a vessel, comprising:

an optical emitter;

a steering mirror, wherein said steering mirror rotates at a frequency;

a first light detector arranged to detect, at a first time, light that is emitted from said optical emitter, reflected from said steering mirror, and reflected from a surface of a material within said vessel;

a second detector arranged to detect, at a second time, light that is emitted from said optical emitter, reflected from said steering mirror, and reflected from a surface of said material within said vessel;

a processing system configured to determine a level of said material based on a time difference between said first and second times.

2. The apparatus of claim 1, wherein said steering mirror, said first detector, and said second detector are located within a structure, and said processing system is remote from said structure.

3. The system of claim 1, wherein said processing system is further configured to determine a volume of said material in said vessel based on said level.

4. The system of claim 3, wherein said processing system is further configured to convert said volume from a first temperature to a second temperature.

5. The system of claim 1, wherein said steering mirror is located within a structure, and said structure further comprises a window located between said steering mirror and an interior of said vessel.

6. The system of claim 5, wherein said window is further comprised of two or more layers.

7. The system of claim 5, further comprising a pipe fitting connecting said structure and said vessel.

8. The system of claim 7, wherein said pipe fitting and said window form a pocket, and an inert gas is maintained in said pocket.

9. The system of claim 1, wherein said steering mirror, said first detector, and said second detector are located within a structure, and said structure pivots about an axis.

10. A method for making a measurement in a vessel, comprising the steps of:

rotating a steering mirror at a frequency;

emitting a light that is incident on said steering mirror;

detecting, at a first time, a first reflection of said light wherein said first reflection is reflected from said steering mirror and a material in said vessel;

detecting, at a second time, a second reflection of said light, wherein said second reflection is reflected from said steering mirror and said material in said vessel;

determining a time difference between said first time and said second time; and determining a level of said material in said vessel based on said time difference.

11. The method of claim 10, further comprising the step of tilting a structure containing said steering mirror until said first and second reflections are at a maximum intensity.

12. The method of claim 10, further comprising the step of determining a volume of said material based on said determined level.

13. The method of claim 12, further comprising the step of converting said volume from a first temperature to a second temperature.

14. The method of claim 12, further comprising the step of maintaining a history of the determined level or the determined volume.

15. The method of claim 12, further comprising the steps of comparing said determined volume with an expected volume, and outputting a signal in accordance with said step of comparing.

16. The method of claim 10, further comprising the steps of comparing said determined level with an expected level, and outputting a signal in accordance with said step of comparing.

17. The method of claim 10, further comprising the step of maintaining an inert gas near a surface of a window located between said steering mirror and an interior area of said vessel.

18. An apparatus for making measurements in a vessel containing a fluid, comprising:

a housing;

a steering mirror located within said housing, wherein said steering mirror rotates at a frequency;

a laser emitter, wherein a laser beam emitted from said laser emitter is incident on an area of said steering mirror;

first and second optical detectors, wherein a first plane formed by said first and second optical detectors and said area of said steering mirror is substantially parallel to a surface of the fluid in said vessel, and wherein said laser beam reflects from said steering mirror and said surface of said fluid and is detected at said first detector at a first time and at said second detector at a second time; and a processing system configured to determine a level of said fluid, and to determine a volume of said fluid in said vessel based on said level.

19. The apparatus of claim 18, wherein said apparatus is installed in a tube at a well head in an oil well system.

20. A method for making a measurement in a vessel, comprising the steps of:

rotating a light source at a frequency;

detecting first and second reflections of light from said light source at first and second times, respectively, wherein said first and second reflections are reflected from a material in said vessel;

determining a time difference between said first and second times; and determining a level of said material in said vessel based on said time difference and said frequency.

21. The method of claim 20, wherein said step of determining further comprises the step of accessing a look-up table.

* * * * *